May 6, 1969   J. B. QUIGLEY ET AL   3,442,047
VEHICLE GUIDING TOY
Filed March 21, 1966

INVENTORS
JOHN B. QUIGLEY
JOHN L. DOHANIC, Jr.
BY
Blum, Moscovitz, Friedman, Blum & Kaplan
ATTORNEY

United States Patent Office 3,442,047
Patented May 6, 1969

3,442,047
VEHICLE GUIDING TOY
John B. Quigley and John L. Dohanic, Jr., Girard, Pa., assignors to Louis Marx & Co., Inc., a corporation of New York
Filed Mar. 21, 1966, Ser. No. 535,893
Int. Cl. A63h 15/00
U.S. Cl. 46—202     3 Claims

ABSTRACT OF THE DISCLOSURE

A vehicle turning and guiding track section for a wheeled vehicle in which a base has an entry end and an exit end with guide means at the entry end and a central guide wall with the guide means guiding a vehicle on to the track section and the guide wall guiding the vehicle therealong.

---

This invention relates generally to a vehicle guiding toy and more particularly to a toy including a plurality of track sections which may be randomly located on a surface and a self-powered vehicle adapted to travel along said surface and be guided by said track sections. The track sections may be randomly placed on the surface, it being desirable that a closed circuit be formed for continuous travel of the self-powered vehicle.

It is an object of this invention to provide track sections of improved construction for receiving a self-propelled vehicle at the entry thereof and delivering said vehicle at the exit in a direction different than the direction of entry, the track being provided with means for effecting a change in direction of travel of the vehicle without impeding the forward motion thereof.

Another object of the invention is to provide a track section for a vehicle guiding toy having improved means for receiving the vehicle and guiding it toward the guiding element of the track.

Still other objects and advantages of the invention will in part be obvious and will in part be apparent from the specification.

Generally speaking, in accordance with the invention, a track section has an entry end and an exit end and guide means therebetween for receiving a vehicle travelling toward the entry end in random directions with respect thereto and orienting such vehicle as it travels along said track in order to deliver the vehicle at the exit end in a predetermined direction.

The invention accordingly comprises the features of construction, combination of elements, and arrangement of parts which will be exemplified in the construction hereinafter set forth, and the scope of the invention will be indicated in the claims.

For a fuller understanding of the invention, reference is had to the following description taken in connection with the accompanying drawing, in which.

Figure 1:
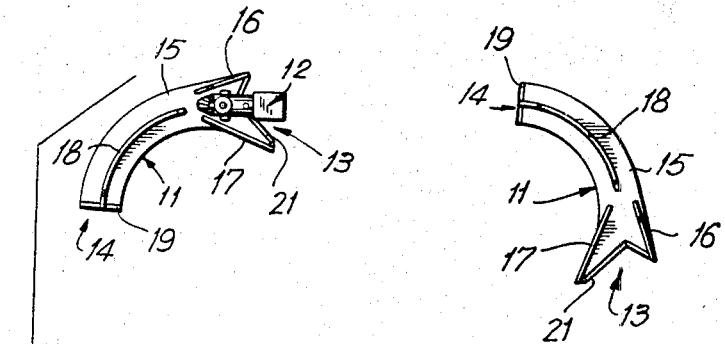
FIG. 1 is a plan view of four track sections constructed in accordance with the invention assembled in a closed circuit layout for a self-propelled vehicle shown entering one of the track sections.

Referring to the drawings, four track sections 11 are shown at the corners of a generally rectangular layout or circuit for guiding a self-propelled vehicle 12 through the circuit. The track sections may be laid out on a floor or other suitable surface with the vehicle adapted to travel in straight lines except when guided by the track sections. The four track sections shown in FIG. 1 are each adapted to guide the vehicle through 90° lefthand turns. It will be understood that track section for righthand turns may also be provided and the child playing with the toy can create layouts with any number of left- and righthand track sections. Naturally, it is desired that a closed circuit be formed for travel of the vehicle, but such is not mandatory and the provision that the individual track sections provide for substantial flexibility which will thereby amuse and maintain the interest of the child over long periods.

Figure 2:
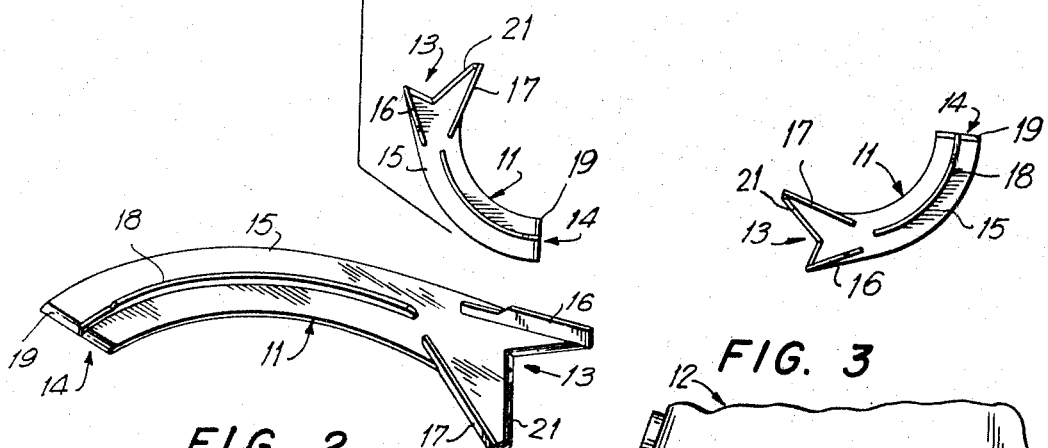
FIG. 2 is a perspective view of a track section constructed in accordance with the invention.

A 90° lefthand track section is more specifically shown in FIG. 2. The track section is preferably molded of plastic as a single piece to thereby provide for mass production of the track sections. The principal structural element of the track is a base 15 along which the vehicle travels with base 15 having an entry end 13 and an exit end 14. The entry end is provided with a pair of converging walls which may be defined as an outer wall 16 and an inner wall 17. Base 15 is of substantially uniform width except at the entry end wherein the width of the base flares to support the converging walls 16 and 17.

From the entry end, outer wall 16 is quite high for a substantial portion of its length in order to provide positive guidance for vehicle 12 when the vehicle approaches either tangentially to the track curvature or in a direction away from the center of curvature. Inner wall 17 is of a substantially lower height which is substantially equal to the height of the terminal portion of outer wall 16. A central curved guide wall 18 extends upwardly from base 15 approximately along the center thereof and has a height substantially equal to the height of inner wall 17 except at the exit end of the track section where guide wall 18 is quite low.

The exit end of base 15 is bevelled as at 19 in order to provide for smooth travel of the vehicle from the track section on to the supporting surface.

The entry end of base 15 is also bevelled and is substantially V-shaped for a purpose to be hereafter described. The leg of the V proximate to outer wall 16 is quite short as compared with the leg of the V proximate to inner wall 17 with the bevel extending along the entire entry edge.

Figure 3:
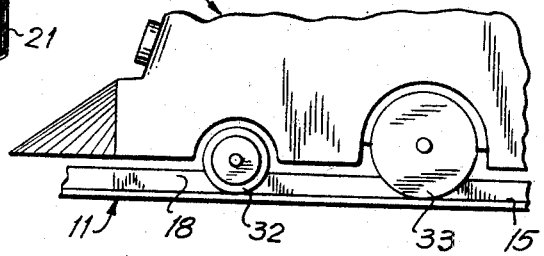
FIG. 3 is a partial elevational view of a toy vehicle adapted for use with the track sections of FIG. 1.

Any suitable self-propelled vehicle may be used in conjunction with the aforesaid track sections. By way of example, there is shown a toy train engine having a body 31, front wheels 32 and drive wheels 33. The drive wheels may be driven by any suitable means (not shown) such as a windup spring motor or a battery-operated electric motor. In a toy of this type, it is preferable that the vehicle have self-contained drive means in order to permit unrestricted, random movement. It will be noted from FIG. 3 that the skirt or lower edge of body 31 is spaced above the surface on which wheels 32 and 33 travel. The height of walls 17, 18 and the terminal end of wall 16 is such that the lower edge of body 31 clears the walls in order that guiding may be done through contact with the vehicle wheels. On the other hand, the high portion of outer wall 16 provides for initially guiding the vehicle as a result of contact with the vehicle body in order to provide positive guiding when the vehicle is moving away from the center of curvature of the track section or tangentially with respect to the arc formed by the curved track section.

The V-shaped entry edge of the base section aids in pointing the vehicle toward the center of the track section. If the vehicle approaches at an angle to the center line of the track section, a not unlikely occurrence, the vehicle freely travels to a point well within walls 16 and 17 before striking edge 21. The front wheels 32 of the vehicle will tend to concurrently engage with the track surface in order to prevent differential friction or resistance from moving the vehicle away from the center line of the track section. Additionally, the omission of the V-shaped receiving edge could result in a deflection of the vehicle away from the track section before it entered between the inner and outer walls and thus the track section would not function as planned.

Figure 4:
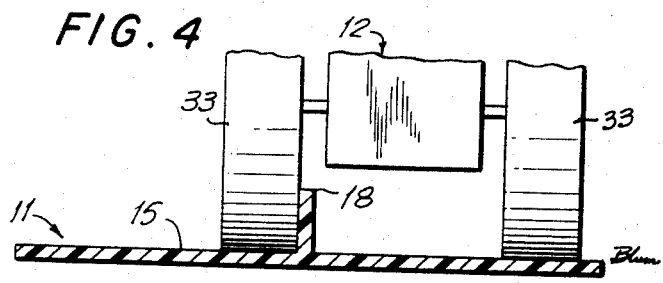
FIG. 4 is a partial elevational view of a vehicle travelling along a section of track, the track being shown in section, disclosing the track vehicle guiding means.

The inner and outer walls converge as shown in FIG. 2 but, of course, are sufficiently spaced at the terminal end to permit passage of the vehicle therebetween. As the vehicle passes between the terminal ends of the inner and outer walls, it tends to travel in a straight line and, with a lefthand curved track as shown in FIG. 2, the inside peripheral edge of front wheel 32 will strike central guide wall 18 to commence guiding of the vehicle through its curved path. The vehicle will, of course, continue its tendency to travel in a straight line and, as the vehicle is deflected, the inside peripheral edge of left drive wheel 33 will also come in contact with central guide wall 18 as shown in FIG. 4. The vehicle will thus be guided in a curved path and its direction changed in accordance with the curvature of the track section. In the example shown, a 90° turn is provided for, but the invention is not so limited. Additionally, a lefthand turn is shown while the invention contemplates turns in either direction. The foregoing description in connection with the specific vehicle wheels which will move into contact with central guide wall 18 will, of course, be reversed in a righthand turn.

The terminal end of central guide wall 18 is substantially lower in height than the main portion thereof to reduce the friction between the guide wall and the vehicle wheels as the vehicle exits from the track section. During sharp turning, a higher wall is required to prevent the wheels from "jumping" the wall. Once the vehicle has been substantially completely turned, the high wall is not required.

Referring again to FIG. 1, a track section 11 is oriented so that a vehicle exiting from one track section will be directed toward the next track section. Since the surfaces on which the track sections are normally placed are generally uneven and we are here dealing with a toy rather than a precision instrument, the vehicle will generally not travel in a perfectly straight line and thus the flared entry end coupled with the V-shaped edge is a substantial aid in effectively causing the vehicle to enter and be guided by the track section.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A vehicle turning and guiding track section for a wheeled vehicle comprising a base, said base having an entry end and an exit end, guide means projecting from said base at said entry end for guiding a vehicle on to said base, said guide means terminating a preselected distance from said entry end, and a curved central guide wall projecting from said base between said exit end and substantially the terminus of said guide means, said entry end of said base terminating at a V-shaped edge angularly displaced in relation to said guide means, the base of said V-shaped edge being wholly within said guide means.

2. A vehicle turning and guiding track section as claimed in claim 1 wherein one leg of said V-shaped edge is substantially shorter than the other leg thereof.

3. A vehicle turning and guiding track section as claimed in claim 2 wherein said V-shaped edge is bevelled along the entire length thereof.

References Cited

UNITED STATES PATENTS 3,218,757  11/1965  Benkoe _____ 46—202

ROBERT PESHOCK, *Primary Examiner.*

ROBERT F. CUTTING, *Assistant Examiner.*